United States Patent [19]

Holm et al.

[11] Patent Number: 5,779,900
[45] Date of Patent: Jul. 14, 1998

[54] IN-SITU CLEANABLE FILTER WITH FILTERED CLEANSER

[75] Inventors: Christopher E. Holm, Madison; Brian W. Schwandt, Fort Atkinson; Brian K. Wagner; Barry M. Verdegan, both of Stoughton; Stephen L. Fallon, Madison, all of Wis.

[73] Assignee: Nelson Industries, Inc., Stoughton, Wis.

[21] Appl. No.: 755,497

[22] Filed: Nov. 22, 1996

[51] Int. Cl.⁶ ............................................. B01D 29/66
[52] U.S. Cl. ..................... 210/411; 210/427; 210/443; 210/450; 210/455
[58] Field of Search ................... 210/209, 248, 210/409, 411, 453, DIG. 17, 427, 443, 450, 455; 55/302, 503, 505; 139/169 R; 15/304

[56] References Cited

U.S. PATENT DOCUMENTS

| | | |
|---|---|---|
| 1,699,680 | 1/1929 | Sweetland .......................... 210/411 |
| 1,866,970 | 7/1932 | Garland et al. . |
| 1,901,484 | 3/1933 | Winslow et al. . |
| 1,955,903 | 4/1934 | Cammen . |
| 1,992,339 | 2/1935 | Winslow . |
| 2,919,704 | 1/1960 | Butler . |
| 3,023,906 | 3/1962 | Moore . |
| 3,044,475 | 7/1962 | Thompson . |
| 3,069,015 | 12/1962 | Hultgren et al. . |
| 3,085,688 | 4/1963 | Eberle . |
| 3,282,429 | 11/1966 | Wood et al. . |
| 3,319,794 | 5/1967 | Gross . |
| 3,333,703 | 8/1967 | Scavuzzo et al. . |
| 3,490,594 | 1/1970 | Hutchins, Jr. . |
| 3,773,180 | 11/1973 | Harrison . |
| 3,867,294 | 2/1975 | Pall et al. . |
| 3,887,467 | 6/1975 | Johnson . |
| 4,177,049 | 12/1979 | Haslett, Jr. .......................... 55/503 |
| 4,322,299 | 3/1982 | Scholten et al. . |
| 4,369,113 | 1/1983 | Stifelman . |
| 4,492,632 | 1/1985 | Mattson . |
| 4,643,836 | 2/1987 | Schmid . |
| 4,720,292 | 1/1988 | Engel et al. . |
| 4,743,374 | 5/1988 | Stifelman . |
| 4,834,885 | 5/1989 | Misgen et al. . |
| 4,859,330 | 8/1989 | Pauwels . |
| 4,969,994 | 11/1990 | Misgen et al. . |
| 5,039,406 | 8/1991 | Whittington . |
| 5,062,398 | 11/1991 | Bedi et al. . |
| 5,066,391 | 11/1991 | Faria . |
| 5,104,537 | 4/1992 | Stifelman et al. . |
| 5,118,417 | 6/1992 | Deibel . |
| 5,145,033 | 9/1992 | Bedi et al. . |
| 5,160,614 | 11/1992 | Brown . |
| 5,259,953 | 11/1993 | Baracchi et al. . |
| 5,342,519 | 8/1994 | Friedmann et al. . |
| 5,462,679 | 10/1995 | Verdegan et al. . |
| 5,522,910 | 6/1996 | Fogal, Sr. .......................... 55/505 |

*Primary Examiner*—Matthew O. Savage
*Attorney, Agent, or Firm*—Andrus,Sceales,Starke & Sawall

[57] ABSTRACT

A filter (102) for filtering fluid from a machine (104) includes a filter housing (106, 250) having a first inlet (114) receiving a first fluid from the machine, a first outlet (116) returning the first fluid to the machine, a second inlet (118) selectively receiving a second fluid from a source (120) of cleaning fluid, and a second outlet (122) for exhausting the second fluid and for exhausting the first fluid from the dirty side of the main filter element (124) in the housing backwashed by the second fluid. The filter housing has a first flow path (126) therethrough from the first inlet then through the filter element in one direction then to the first outlet, and has a second flow path from the second inlet then through the filter element in the opposite direction then to the second outlet, the first and second flow paths having common but opposite direction portions through the filter element. A second filter element (156) is provided in the second flow path.

56 Claims, 7 Drawing Sheets

IN-SITU CLEANABLE FILTER WITH FILTERED CLEANSER

BACKGROUND AND SUMMARY

The invention relates to filters which may be cleaned in place, i.e without removing the filter from the machine whose fluid is being filtered. The invention more particularly relates to an in-situ cleanable filter having an auxiliary filter for filtering the cleaning fluid which backflushes the main filter.

The present invention arose during further development efforts relating to the subject matter of commonly owned U.S. Pat. No. 5,462,679, incorporated herein by reference. Such subject matter generally relates to an apparatus and method for cleaning oil filters, and more particularly, pertains to an apparatus and method using pressurized air to clean oil filters at a convenient site relative to the installation of the oil filter on an apparatus such as an internal combustion engine.

In the present invention, a second filter element is provided for filtering the cleaning fluid used to backwash the main filter. This protects the main filter against contamination during the cleaning operation which may otherwise introduce abrasive, damaging particles into the clean side of the filter and ultimately to engine or machine components that the filter should protect.

In various prior uses, the compressed air can be filtered, but contaminant can enter from lines downstream of the compressed air filter or even from dirt on the air inlet valve. In some instances, there is no compressed air filter at all. The present invention provides a simple and effective solution.

In a desirable implementation, the present invention may be used in combination with the housing shell and adapter plate structure of commonly owned co-pending U.S. application Ser. No. 08/755,479, filed on even date herewith, incorporated herein by reference.

BRIEF DESCRIPTION OF THE DRAWINGS

FIGS. 1 and 2 are taken from incorporated U.S. Pat. No. 5,462,679.

DETAILED DESCRIPTION

Subject Matter of U.S. Pat. No. 5,462,679

Figure 1:
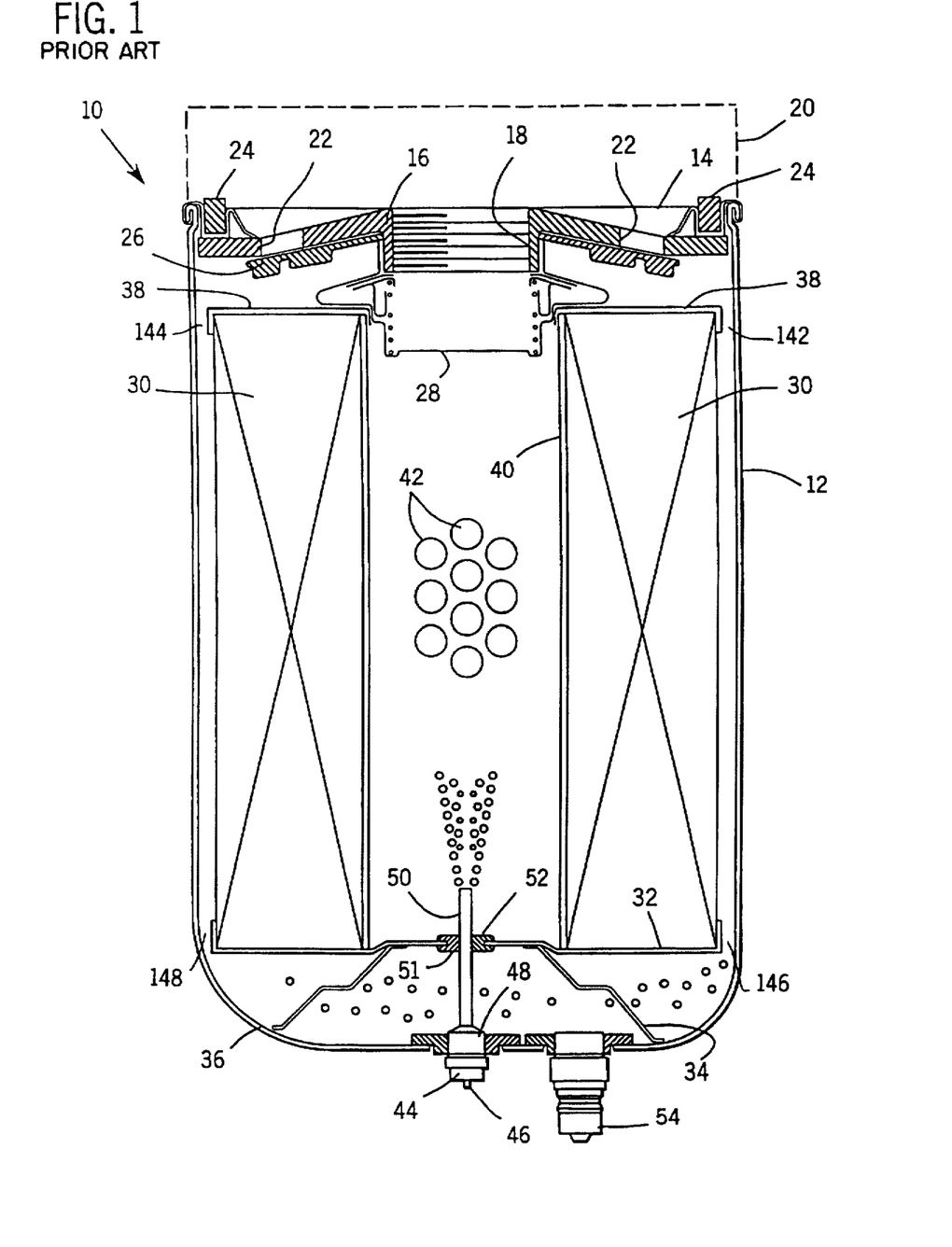
FIG. 1 is a cross-sectional view of a reusable oil filter according to the noted '679 patent.

Referring now to FIG. 1, the subject matter of the noted '679 patent is embodied in a cleanable oil filter 10 generally referred to as a spin-on type oil filter. Filter 10 comprises a housing 12 having an upper end portion 14 formed with an internally threaded oil outlet 16. The internal threads of outlet 16 permit filter 10 to be threadingly engaged with a mounting boss 18 normally located on an apparatus such as an engine block 20 of an internal combustion engine used to drive a vehicle. Spaced outwardly from outlet 16 is an oil inlet 22 for recovering oil to be filtered from an oil pump (not shown) and a gasket 24 for sealing end portion 14 against engine block 20. An anti-drainback valve 26 is provided beneath oil inlet 22 for preventing backflow of oil from housing 12. Located directly beneath oil outlet 16 is a bypass valve 28 used to ensure adequate oil supply should filter 10 become plugged.

A porous filter element 30, typically cylindrical in shape and normally comprised of pleated synthetic, cellulose papers, fiberglass or other disposable filter media, is disposed in housing 12 and has a base end cap 32 supported on a spring clip 34, or other suitable retaining device, positioned on a lower end portion 36 of housing 12. The filter media is tubular and has a radially outer inlet side fluidly connected to the inlet 22 and an interior outlet side defining a void space, the void space being fluidly connected to the outlet 16. The upper end of filter element 30 is retained in position by an upper end cap 38 disposed adjacent bypass valve 28. Filter element 30 defines a hollow, foraminous center tube 40 having a plurality of apertures 42 for distributing oil and surrounds the void space.

An air inlet 44 is formed centrally on the lower end portion 36 of housing 12 and has one end 46 connected to a source of compressed air or other suitable gas during cleaning. Inlet 44 has another end 48 connected to an elongated tube 50 which extends upwardly through a central opening 51 formed in base end cap 32 into center tube 40 and passes through a support grommet 52 mounted in central opening 51. Grommet 52 functions as a seal to prevent communication between oil inlet 22 and oil outlet 16. Tube 50 serves as a restrictive channel for directing pressurized air into filter 10 such that filter element 30 and housing 12 will not be damaged or destroyed. Inlet 44 is normally closed during the regular filtering of oil within filter 10.

An oil drain 54 is preferably located laterally adjacent air inlet 44 on the lower end 36 of housing 12, but may be disposed elsewhere on housing 12. Like inlet 44, oil drain 54 is normally closed during the conventional filtering of oil in filter 10.

In use, filter 10 is screw threaded on mounting boss 18 of engine block 20 and oil is pumped through inlet 22 and through filter element 30, normally in an outside to inside flow. Contaminants are filtered out and filtered oil flows out through outlet 16 for lubricating the components of the engine. As captured contaminants build up in filter element 30, the pressure drop across filter 10 increases. At the normal time of an oil change, flow of contaminated oil to filter 10 is ceased and filter 10 is cleaned.

Cleaning is accomplished with filter 10 remaining connected to mounting boss 18 by attaching a compressed air line to inlet 44 and simultaneously opening oil drain 54. Initially compressed air forces clean filtered oil from the downstream side of housing 12 to backflow through filter element 30 so as to displace significant quantities of contaminants from filter element 30. After the majority of the downstream oil has been backflushed through filter element 30, the residual oil and air create an air-oil foam. The bubbles of this foam displace oil and create turbulence inside and outside filter element 30. This scours contaminants from the filter element 30 and fiber surfaces. The foam also acts as a contaminant carrier to assist in the transport of contaminants out of filter element 30. The net result is a cleaned filter 10 with lower pressure drop which may be reused. During the cleaning process, contaminated oil and air is drained out of oil drain 54. Typically, the entire process takes less than three minutes, although the actual time varies as a function of the filter characteristics and cleaning conditions. While the cleaning process occurs, oil in the engine or equipment can be changed in the usual manner. After the compressed air line has been removed, oil drain has been closed, and contaminated oil replaced with fresh oil, housing 12 can be refilled with oil by restarting the oil pump.

By using air along with residual oil to clean filter 10, the total volume of cleaning fluid can be increased without increasing the volume of waste oil to be disposed. In addition, the provision of separate air inlet 44 and oil drain 54 integrally found in housing 12 allows efficient cleaning operation without need for special auxiliary adapters used remote from the engine.

Figure 2:
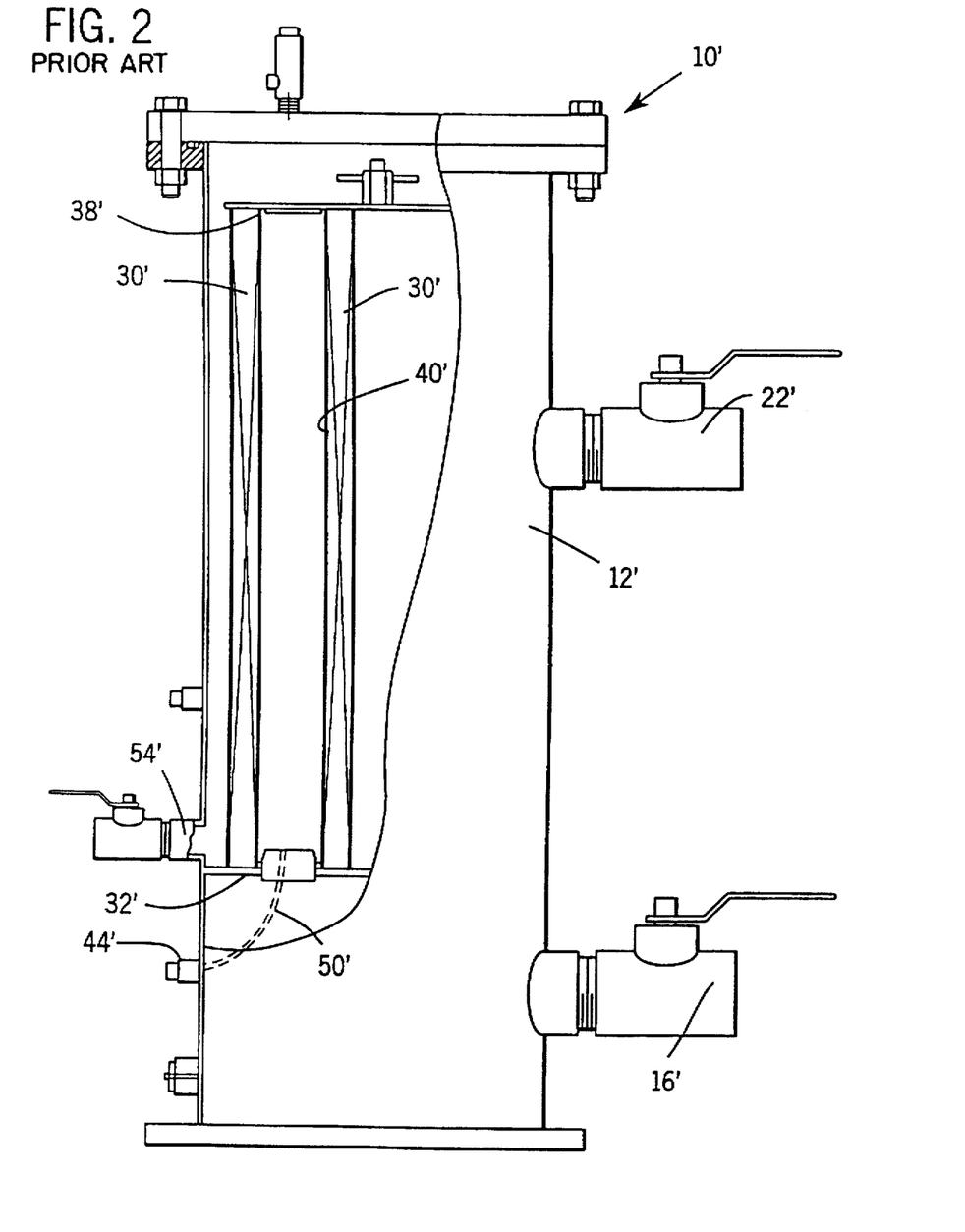
FIG. 2 is a fragmentary, elevational view of an alternative version of a reusable oil filter.

FIG. 2 discloses an alternative cleanable filter 10' generally recognized as a cartridge type oil filter used on large stationary engines. Filter 10' includes a housing 12' operatively connected to an engine by an oil outlet 16' and an oil inlet 22' provided on the side of housing 12'. Filter element 30' is maintained in place between a pair of retaining plates or end caps 32',38' which define a center tube 40' for distributing oil. A separate air inlet 44' joined by a tube 50' to center tube 40', and oil drain 54' are formed on housing 10' and function in the same manner as previously described above to provide an oil filter 10 which is cleanable in situ.

As noted in the '679 patent, the subject matter thereof enhances the utility of a typical oil filter by the addition of a separate cleaning inlet and drain outlet which permit efficient cleaning of a filter while installed on an apparatus such as an internal combustion engine as well as a hydraulic power transmission or fuel filtration system. Such an arrangement is cost efficient, reduces waste disposal problems and conserves valuable resources. Since air is the only additional cleaning fluid utilized, cleaning is fast and convenient and no additional waste is generated by the cleaning process. There is no need for time consuming drying steps used to remove oil and cleaning fluid. The use of a restrictive channel for controlling the pressurized air flow increases safety and allows optimization of the cleaning process for a particular filter design where air flow may need to be increased or decreased.

Present Invention

Figure 3:
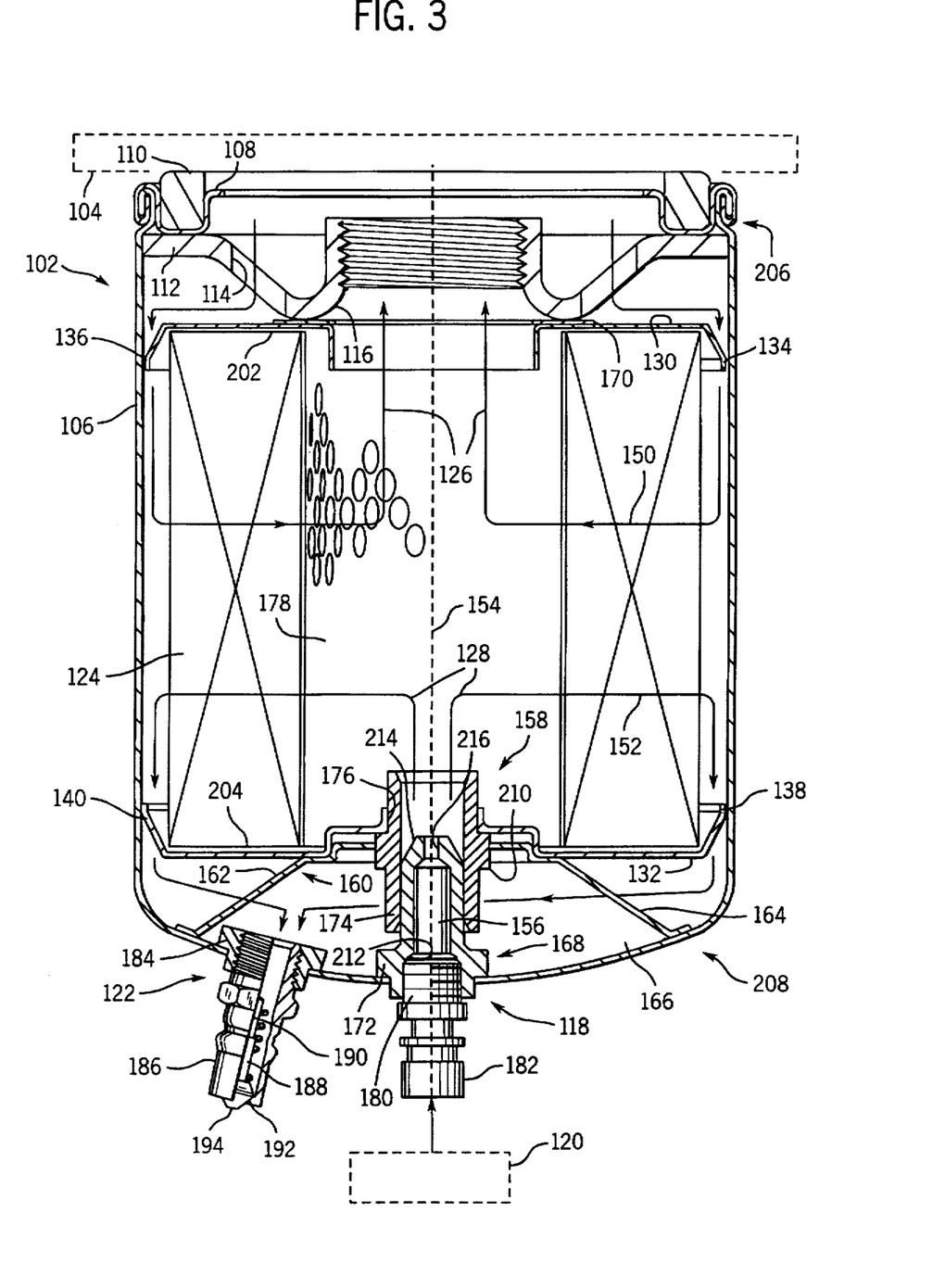
FIG. 3 is a sectional view of a filter in accordance with the present invention.

FIG. 3 shows a filter 102 for filtering fluid from a machine 104 such as an internal combustion engine. A filter housing 106 is provided by a drawn steel can closed by an upper turned and curled annular lip 108 having an annular rubber sealing ring 110 on one side for sealing against machine 104, such as at the engine block. Beneath the lip is an adaptor plate 112 having a plurality of circumferentially spaced openings 114 providing an inlet for receiving fluid from machine 104, for example engine oil, and having an outlet 116 for returning the fluid to machine 104. Outlet 116 is internally threaded for mounting to a mounting boss of an engine as is standard. The filter housing has a second inlet 118 selectively receiving a second fluid from a source 120 of cleaning fluid, for example pressurized air from a pressurized air source. The filter housing has a second outlet 122 for exhausting the second fluid and for draining the first fluid from the dirty side of filter element 124 in the housing.

The filter housing has a first flow path 126 therethrough from inlet 114 then through filter element 124 then to outlet 116. The filter housing has a second flow path 128 therethrough from inlet 118 then through filter 124 then to outlet 122. Filter element 124 has top and bottom end caps 130 and 132, each with a plurality of outwardly crimped or formed tangs such as 134, 136, 138, 140 about their respective circumferences and engaging the inner sidewall of the housing and defining between respective tangs arcuate gaps such as 142, 144, 146, 148, FIG. 1, through which fluid flows along its respective flow path between the inner wall of the housing and the respective end cap 130, 132. Flow paths 126 and 128 have common but opposite direction portions 150 and 152 through filter element 124. The direction of flow path portion 150 is radially inward relative to axis 154. The direction of flow path portion 152 is radially outward relative to axis 154.

Figure 6:
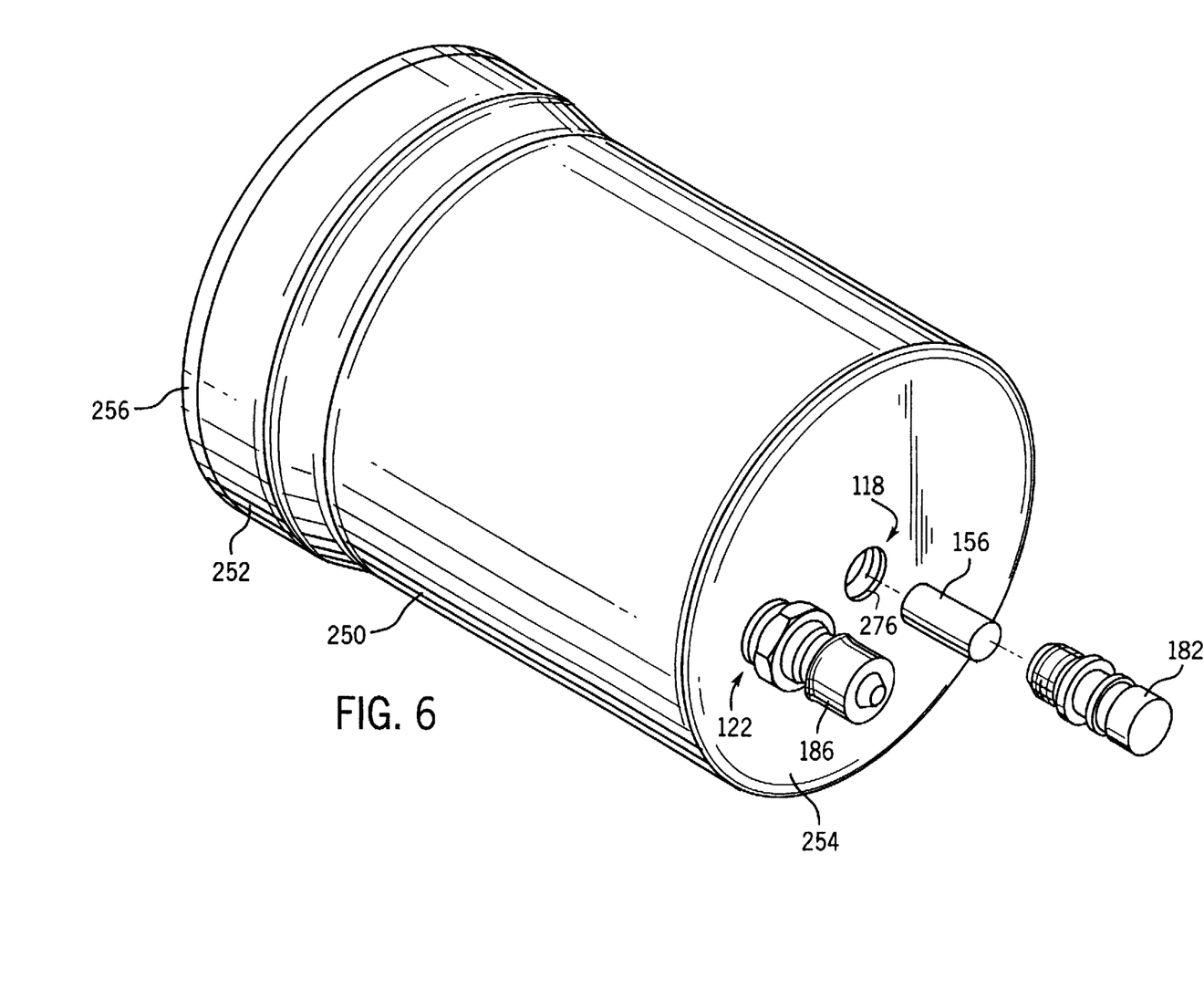
FIG. 6 is an exploded perspective view of a portion of the structure of FIG. 5.

A second filter element 156, FIGS. 3 and 6, is provided in second flow path 128, for filtering the second fluid, such as the cleansing pressurized air from source 120. Filter element 156 is downstream of inlet 118 and upstream of filter element 124 along second flow path 128. Cleaning fluid flows from second inlet 118 then through second filter element 156 then through first filter element 124 then to second outlet 122. A seal 158, to be further described, is provided to block direct flow of the cleaning fluid from the output of second filter element 156 to second outlet 122, such that the cleaning fluid when exiting second filter element 156 must first flow through filter element 124 along flow path 128 along direction 152 in order to reach outlet 122.

A spacer 160 is provided by a plurality of spring fingers such as 162, 164 spacing filter element 124 from the bottom of housing 106 to form a collection space 166 in communication with outlet 122. A fitting 168 extends from inlet 118 through the collection space and into the first filter element 124. Second filter element 156 is received in fitting 168. At the upper end of filter element 124, an annular flat gasket 170 provides a seal axially between adaptor 112 and filter element 124. Spring fingers 162, 164 bias filter element 124 axially upwardly in FIG. 3 to compress sealing gasket 170 between adaptor 112 and the upper end of filter element 124.

Fitting 168 includes a first section 172 welded to the bottom wall of housing 106 and extending therethrough, and a second section 174 concentrically surrounding the upper portion of first section 172 and extending upwardly through an aperture 176 in lower end cap 132 and into hollow interior 178 of filter element 124. Section 172 is received in section 174 in telescoping relation. Section 172 has an externally accessible open axial end 180 receiving an air inlet valve 182 in threaded relation. Valve 182 is a standard needle air valve known in the prior art, for example as used in pneumatic tires and the like.

Second outlet 122, FIG. 3, provides a drain comparable to above noted drain 54, FIG. 1. Outlet 122 is provided by a fitting 184 welded to the bottom wall of housing 106 and extending therethrough and receiving a valve 186 in threaded relation. Valve 186 has a valve stem or plunger 188 biased by a spring 190 to provide a seal at 192, which may be opened by pushing the valve stem inwardly at 194. Second outlet 122 exhausts the noted cleaning fluid, such as pressurized air. Second outlet 122 also exhausts and enables draining of the first fluid such as engine oil from the dirty side, i.e. radially outward side, of first filter element 124 backwashed by the noted second cleaning fluid.

In FIG. 3, the noted seal 158 is provided by direct engagement of upper section 174 of fitting 168 and end cap 132 at aperture 176. The seal need not be tight, but merely provide a higher flow resistance relative to path 128 such that most of the cleaning fluid, such as air, will follow path 128 as the path of least resistance. In other embodiments, seal 158 is provided by an intermediate resilient member, such as O-ring 196, FIG. 4, grommet 198, FIG. 5, grommet 200, FIG. 7, to be described.

Filter element 124 is an annular cartridge member having the noted hollow interior 178. Second filter element 156 is in the noted second flow path 128 between second inlet 118 and hollow interior 178 of first filter element 124. Annular filter element 124 extends along axis 154 and has first and second axially spaced ends 202 and 204. Second end 204 is axially spaced from second inlet 118 by the noted collection space 166. Second filter element 156 is axially between second end 204 and second inlet 118.

Housing 106 has a first axial end 206 at first outlet 116 and a second axial end 208 at second inlet 118. Annular filter element 124 has the noted first and second axially spaced ends 202 and 204 proximate housing ends 206 and 208, respectively. Fitting 168 has the noted first section 172 extending through second housing end 208 and providing the noted second inlet 118. Section 172 has an internal side extending interiorly of housing 106 and receiving second filter element 156. The fitting has the noted second section 174 extending through the second end 204 of filter element 124. Second section 174 has a first lower side extending out of filter element 124 and receiving first section 172. Section 174 has a second upper side extending into filter element 124 and passing the noted cleaning fluid from second filter element 156 to first filter element 124. End cap 132 at aperture 176 engages section 174 adjacent the spacer provided by spring fingers 162, 164 and on the opposite axial side thereof from second inlet 118. Second section 174 has a raised annular shoulder 210 of a first diameter. Aperture or opening 176 has a second diameter. First section 172 is received in second section 174 in telescoping relation and engaged at an opening of a third diameter. The noted first diameter is larger than the noted second diameter. The noted second diameter is larger than the noted third diameter.

Lower section 172 of fitting 168 has a threaded opening 180 extending inwardly to an internal cavity 212. Valve 182 is threaded into opening 180. Filter element 156 is mounted in section 172 and trapped and retained in internal cavity 212 therein between valve 182 and opposite axial end wall 214 having opening 216 therein. Opening 216 provides the previously noted restrictive channel.

Figure 4:
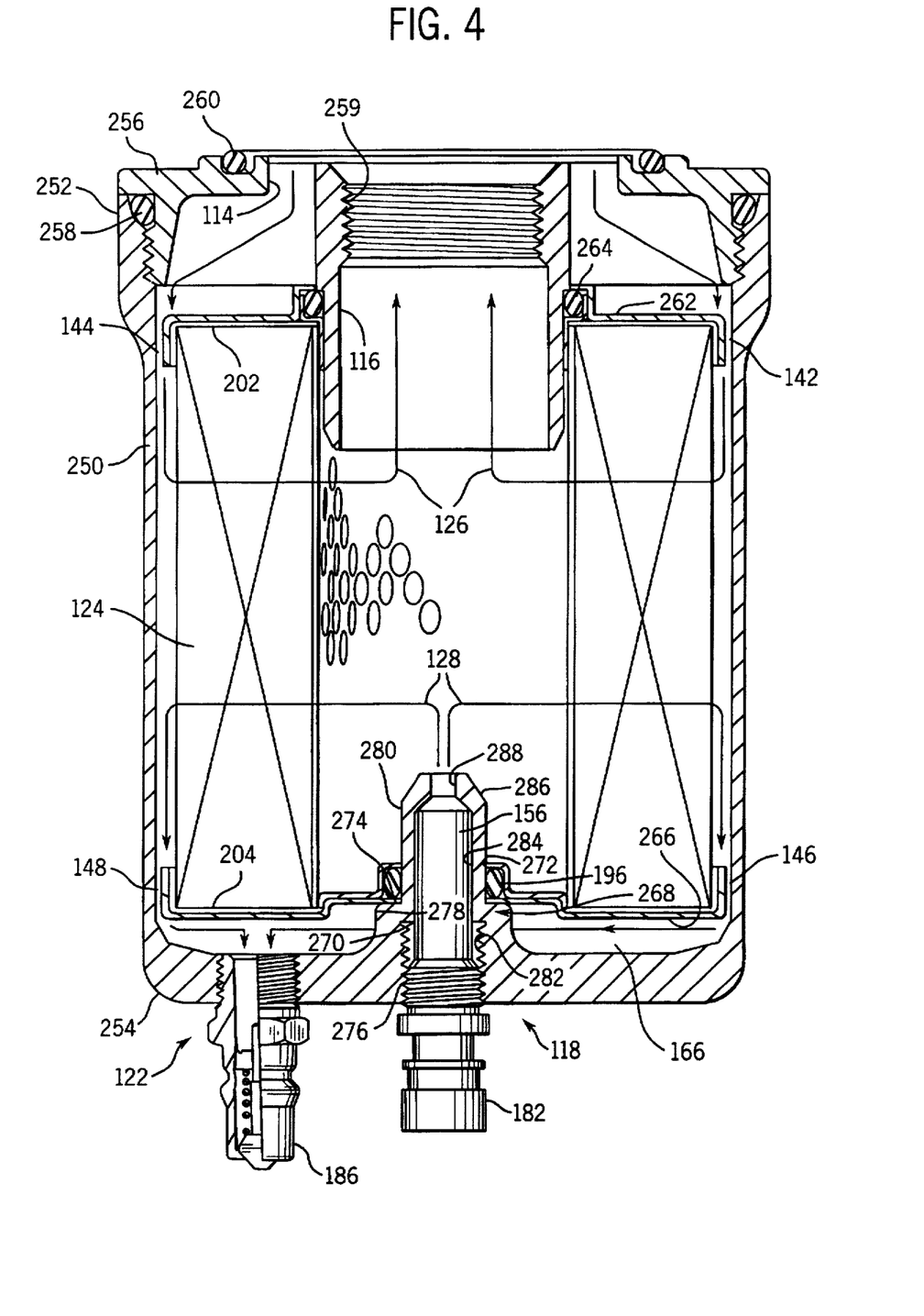
FIG. 4 is a view like FIG. 3 and shows a further embodiment.

FIG. 4 shows another embodiment, and uses like reference numerals from above where appropriate to facilitate understanding. Filter housing 250 extends axially between first and second axially spaced ends 252 and 254. First filter element 124 extends axially between first and second axially spaced ends 202 and 204. The filter housing is mounted to an adapter plate 256 in threaded relation and sealed thereto at O-ring 258. The adapter plate is mounted to a machine such as 104 at threaded outlet 259 and sealed thereto at O-ring 260. The upper end 202 of filter 124 has an upper end plate 262 retaining an O-ring 264 engaging the central outlet 116 of the adapter plate in sealing relation. Lower O-ring 196 is retained in lower end plate 266. Fitting 168 of FIG. 3 is provided by an axially extending boss 268 in FIG. 4 extending from lower end 254 of the housing axially toward the upper end of the housing and having a central axially extending passage 270 receiving second filter element 156. Boss 268 extends through aperture 272 of end cap 266. Resilient O-ring 196 bears radially between the boss and the end cap and provides the noted seal 158. Boss 268 has an annular shoulder 274 axially engaging end cap 266 and axially spacing lower end 204 of filter element 124 from lower end 254 of the housing to form collection space 166.

Axially extending boss 268 is integrally formed on the interior of housing 250 and provides both the noted fitting and the noted spacer.

Boss 268, FIG. 4, has the noted internal cavity 270 receiving second filter element 156. The boss has a threaded opening 276 at lower end 254 of the housing communicating with internal cavity 270 communicating with second filter element 156, and has an opposite axial lower end facing outwardly of the housing. Externally accessible valve 182 is threaded into threaded opening 276. Boss 268 has a first lower section 278 of a first outer diameter and first inner diameter and extending axially inwardly from lower end 254 of the housing. The boss has a second upper section 280 of a second outer diameter and second inner diameter and extending axially inwardly from first section 278. The noted first outer diameter of section 278 is greater than the noted second outer diameter of section 280. Second section 280 of the boss extends through aperture 272 of end cap 266 and is engaged by the annular seal provided by O-ring 196 captured in end plate 266. Sections 278 and 280 of the boss meet at axially facing shoulder 274, and O-ring seal 196 engages the boss at the junction of shoulder 274 and second section 280.

Cavity 270 in boss 268 is formed by the first section 278 of the boss at a first inner diameter providing a first cavity portion 282, and by the second section 280 of the boss at a second inner diameter providing a second cavity portion 284. The noted first inner diameter of first cavity portion 282 is larger than the noted second inner diameter of second cavity portion 284. Second filter element 156 extends axially and is disposed in both cavity portions 282 and 284. First cavity portion 282 is threaded at 276. The noted second outer diameter of second boss section 280 is substantially equal to the noted first inner diameter of first cavity portion 282. Filter element 156 is retained and trapped between valve 182 and opposite axial end wall 286 having restrictive channel opening 288.

Figure 5:
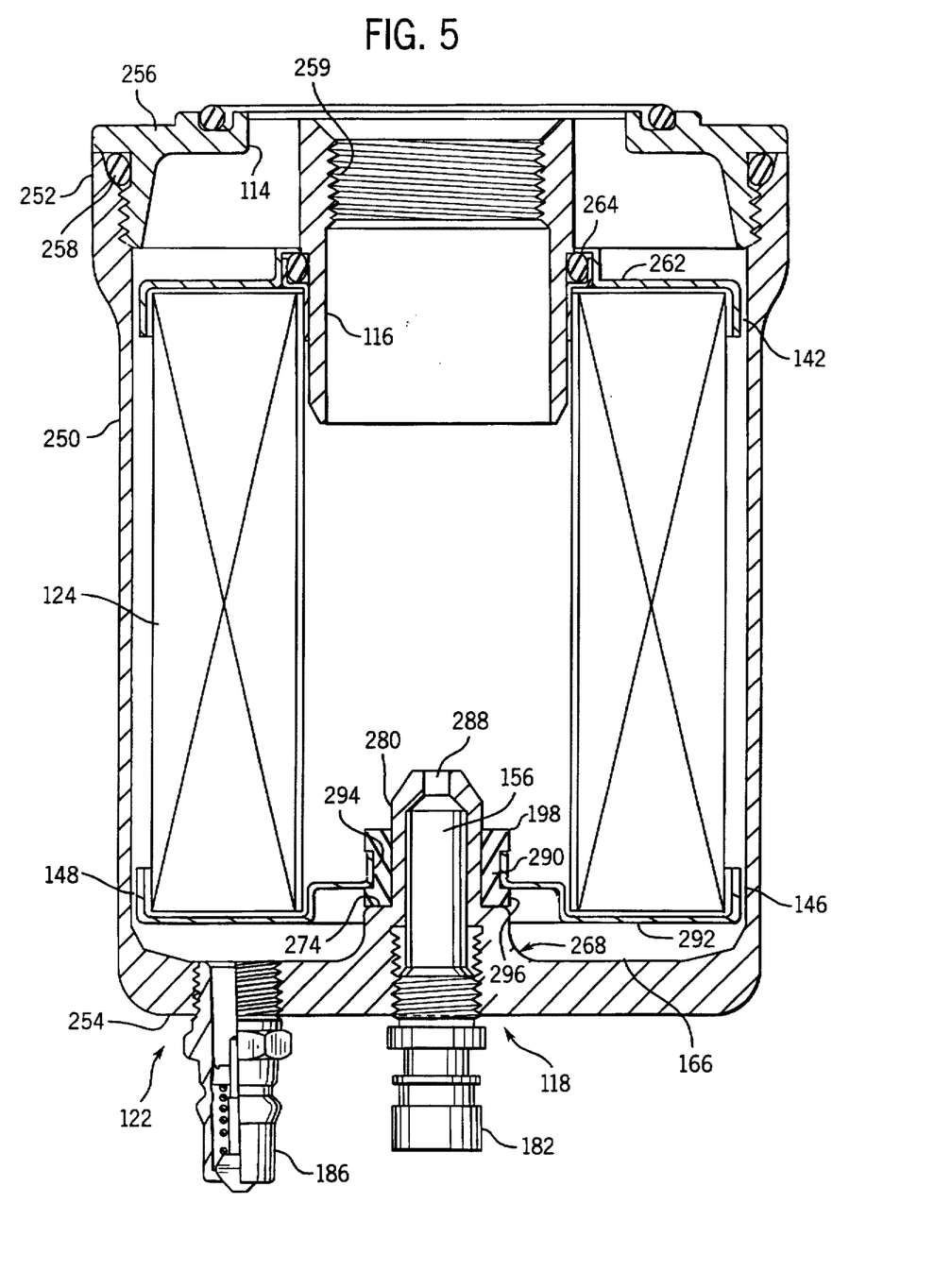
FIG. 5 is a view like FIG. 4 and shows further embodiment.

FIGS. 5 and 6 show a further embodiment and use like reference numerals from FIGS. 3 and 4 where appropriate to facilitate understanding. O-ring 196 of FIG. 4 is replaced by grommet 198 in FIG. 5 having an outer annular surface of a first diameter 290 engaging lower end cap 292 of first filter element 124 at aperture 294. Grommet 198 has an outer annular surface 296 of a second diameter larger than the noted first diameter of surface 290 and axially between shoulder 274 of boss 268 and end cap 292 at aperture 294.

Figure 7:
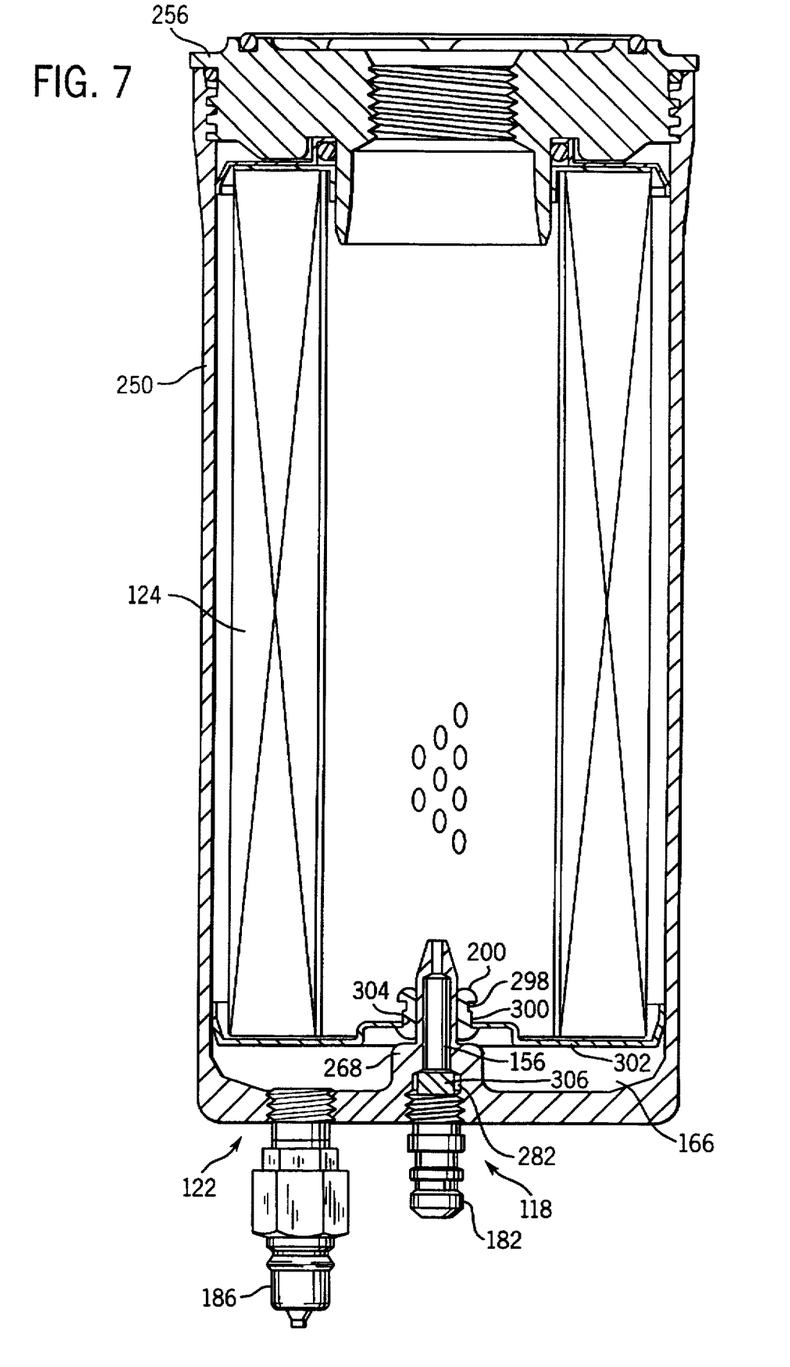
FIG. 7 is a view like FIG. 5 and shows a further embodiment.

FIG. 7 shows a further embodiment and uses like reference numerals from above where appropriate to facilitate understanding. In FIG. 7, grommet 198 of FIG. 5 is replaced by a grommet 200 having differing outer diameter portions 298 and 300 for engaging end plate 302 of filter element 124 at aperture 304. Also in FIG. 7, a different type of second filter element 306 is used. In FIG. 7, filter element 306 is a flat disc like or pancake type filter element and may be used in addition to or in place of filter element 156, i.e. in FIG. 7, filter element 156 may be deleted. This embodiment is desirable to enable use of different types of cleansing filter elements and materials and/or piggybacking of multiple cleaning filter elements. In FIG. 7, filter element 306 is disposed only in first cavity portion 282 of boss 268.

In applications on an internal combustion engine, air is preferred as the cleaning fluid because it will not contaminate internal engine parts. Most of the air introduced at inlet 118 into hollow interior 178 of filter element 124 flows as shown at 128 because this is the path of least resistance as compared to the engine galleries downstream of outlet 116.

Furthermore, most of the air flowing at path portion 152 flows to outlet 122 because this is the path of least resistance as compared to the oil pump upstream of inlet 114. However, some air will escape through outlet 116 and inlet 114, and hence air is preferred for such applications. In those applications where ports 116 and 114 can be plugged or closed, or where leakage therethrough does not matter, a greater variety of cleaning fluids may be used for introduction at inlet 118.

The invention is applicable to single element housing designs as in FIGS. 1 and 3–7, and to multiple element designs as in FIG. 2. In the latter, a second filter element can be provided for each line such as 50' routed to an individual element such as 30', thus providing multiple second filter elements, or a single common second filter element may be provided at the second inlet such as 44' before individual multiple lines such as 50' branch out in parallel to respective filter elements 30'.

It is recognized that various equivalents, alternatives and modifications are possible within the scope of the appended claims. In the preferred embodiment, the noted first fluid is oil, and the second fluid is air.

We claim:

1. A filter for filtering fluid from a machine, comprising:
   a filter housing having a first inlet receiving a first fluid from said machine, a first outlet returning said first fluid to said machine, a second inlet selectively receiving a second fluid from a source of cleaning fluid, and a second outlet exhausting said second fluid;
   a first filter element in said filter housing;
   said filter housing having a first flow path therethrough from said first inlet then through said first filter element in one direction then to said first outlet;
   said filter housing having a second flow path therethrough from said second inlet then through said first filter element in the opposite direction then to said second outlet, said first and second flow paths having common but opposite direction portions through said first filter element; and
   a second filter element disposed within said filter housing and in said second flow path.

2. The filter according to claim 1 wherein said second filter element is downstream of said second inlet and upstream of said first filter element along said second flow path, such that said second fluid flows from said second inlet then through said second filter element then through said first filter element then to said second outlet and comprising a spacer spacing said first filter element from said housing to form a collection space in communication with said second outlet, and a fitting extending from said second inlet through said collection space and into said first filter element, said second filter element being retained in said fitting.

3. The filter element according to claim 2 wherein said first filter element has an end cap facing said second outlet, and said fitting has different outer diameter sections meeting at an axially facing shoulder engaging said end cap.

4. The filter according to claim 3 comprising a seal engaging said fitting at said shoulder and blocking direct flow of said second fluid from the output of said second filter element to said second outlet, such that said second fluid when exiting said second filter element must first flow through said first filter element along said second flow path and in said opposite direction in order to reach said second outlet.

5. The filter according to claim 4 wherein said housing extends axially between first and second axially spaced ends, said first filter element extends axially between first and second axially spaced ends, and comprising an adapter mounting said filter housing to said machine, and a second seal axially between said adapter and said first end of said first filter element, and wherein said spacer comprises one or more biasing members biasing said first filter element axially toward said first end of said housing to axially compress said second seal between said adapter and said first end of said first filter element.

6. The filter according to claim 4 wherein said housing extends axially between first and second axially spaced ends, said first filter element extends axially between first and second axially spaced ends, said second end of said first filter element being closed by an end cap having an aperture therethrough through which said fitting extends, said seal being provided by engagement of said fitting at said shoulder and said end cap at said aperture.

7. The filter according to claim 2 wherein said fitting extends from said second inlet into said first filter element.

8. The filter according to claim 7 wherein said fitting comprises a boss extending integrally from said housing into said first filter element and having an internal cavity receiving said second filter element.

9. The filter according to claim 7 wherein said fitting extends from said second inlet along an axis into said housing and then into said first filter element and defines a portion of said second flow path, said fitting having an internal axially extending cavity having a wall with an opening therethrough communicating with the interior of said first filter element, and having an opposite axial open end, said second filter element being received in said cavity, said second inlet being mounted to said fitting at said opposite axial open end and closing said cavity and trapping said second filter element therein.

10. The filter according to claim 9 wherein said wall is an axial end wall distally opposite said axial open end, and wherein said second filter element is stopped against said axial end wall.

11. The filter according to claim 2 comprising a third filter element in said second flow path.

12. The filter according to claim 11 wherein said second and third filter elements are in series in said second flow path such that said cleaning fluid flows first through said third filter element then through said second filter element.

13. The filter according to claim 12 wherein said second and third filter elements are downstream of said second inlet and upstream of said first filter element along said second flow path, such that said second fluid flows from said second inlet then through said third filter element then through said second filter element then through said first filter element then to said second outlet.

14. The filter according to claim 11 wherein said second and third filter elements differ in at least one of material and shape.

15. The filter according to claim 2 wherein said first fluid is lubricating oil, and said second fluid is air.

16. The filter according to claim 1 wherein said housing extends axially between first and second axially spaced ends, said second end of said first filter element is closed by an end cap having an aperture therethrough, and comprising a fitting retaining said second filter element and extending from said second inlet axially toward said first end of said housing and axially through said aperture and a seal bearing radially and axially between said fitting and said end cap at said aperture.

17. The filter according to claim 16 wherein said seal comprises an annular resilient member.

18. The filter according to claim 17 wherein said annular resilient member is an O-ring.

19. The filter according to claim 1 wherein said housing extends axially between first and second axially spaced ends, said first filter element extends axially between first and second axially spaced ends, said second end of said first filter element is closed by an end cap having an aperture therethrough, and comprising a boss extending axially from said second end of said housing axially toward said first end of said housing and axially through said aperture and having a shoulder facing said end cap and having a central axially extending passage retaining said second filter element to provide a fitting therefor.

20. The filter according to claim 10 wherein said shoulder axially spaces said second end of said first filter element from said second end of said housing to provide a spacer forming a collection space in communication with said second outlet such that said boss provides both said fitting and said spacer.

21. The filter according to claim 11 wherein said boss is integrally formed on the interior of said housing.

22. The filter according to claim 1 wherein said first filter element is an annular member having a hollow interior, and said second filter element is in said second flow path between said second inlet and said hollow interior of said first filter element said second filter element being retained in a fitting, said fitting having an inlet port admitting said second fluid to an upstream end of said second filter element, and said fitting having an outlet port discharging said second fluid from a downstream end of said second filter element, said outlet port of said fitting having a smaller diameter than said inlet port of said fitting.

23. The filter according to claim 22 wherein said annular member extends along an axis and has first and second axially spaced ends, said second axially spaced end being axially spaced from said second inlet, and wherein at least a portion of said second filter element is axially between said second axially spaced end and said second inlet.

24. The filter according to claim 22 wherein said housing has a first axial end at said first outlet and a second axial end at said second inlet, and said annular member has first and second axially spaced ends proximate said first and second ends, respectively, of said housing, and comprising a fitting comprising a first section extending through said second end of said housing and providing said second inlet, said first section having an internal side extending interiorly of said housing and receiving said second filter element, said fitting comprising a second section extending through said second end of said first filter element, said second section having a first side extending out of said first filter element and receiving said first section, said second section having a second side extending into said first filter element and passing said second fluid from said second filter element to said first filter element.

25. The filter according to claim 24 comprising a spacer extending from said second end of said housing and engaging said second end of said first filter element and spacing same from said second end of said housing, wherein said first section is mounted to said second end of said housing, said second section engages said first section, said second end of said first filter element has an end cap with an aperture therethrough through which said second section extends, said end cap at said aperture engages said second section in sealing relation adjacent said spacer and on the opposite axial side thereof from said second inlet.

26. The filter according to claim 24 wherein said first section has a threaded opening with an internal cavity communicating with said second filter element and an opposite axial end facing outwardly of said housing, and comprising an externally accessible valve threaded into said threaded opening.

27. The filter according to claim 22 wherein said housing has a first axial end at said first outlet and a second axial end at said second inlet, and said annular member has first and second axially spaced ends proximate said first and second ends, respectively, of said housing, and comprising a boss extending from said second end of said housing axially toward said first end of said housing and through said second end of said first filter element and into said hollow interior thereof, said boss having an internal cavity receiving said second filter element.

28. The filter according to claim 27 wherein said boss has a threaded opening at said second end of said housing communicating with an internal cavity communicating with said second filter element and an opposite axial end facing outwardly of said housing, and comprising an externally accessible valve threaded into said threaded opening.

29. The filter according to claim 27 wherein said boss has a first section of a first outer diameter and first inner diameter extending axially inwardly toward said first filter element from said second end of said housing, and said boss has a second section of a second outer diameter and second inner diameter extending axially inwardly toward said first filter element from said first section, wherein said first outer diameter is greater than said second outer diameter.

30. The filter according to claim 29 wherein said second end of said first filter element is closed by an end cap having an aperture therethrough through which said second section of said boss extends.

31. The filter according to claim 30 comprising an annular seal engaging said boss at said second section.

32. The filter according to claim 29 wherein said cavity is formed by said first section of said boss at said first inner diameter providing a first cavity portion, and by said second section of said boss at said second inner diameter providing a second cavity portion, and wherein said first inner diameter is larger than said second inner diameter.

33. The filter according to claim 32 wherein said first cavity portion is threaded, and wherein said second outer diameter is substantially equal to said first inner diameter.

34. A filter for filtering fluid from a machine comprising:
a filter housing having a first inlet receiving a first fluid from said machine a first outlet returning said first fluid to said machine, a second inlet selectively receiving a second fluid from a source of cleaning fluid, and a second outlet exhausting said second fluid;
a first filter element in said filter housing;
said filter housing having a first flow path therethrough from said first inlet then through said first filter element in one direction then to said first outlet;
said filter housing having a second flow path therethrough from said second inlet then through said first filter element in the opposite direction then to said second outlet, said first and second flow paths having common but opposite direction portions through said first filter element; and
a second filter element in said second flow path,
wherein said second filter element is downstream of said second inlet and upstream of said first filter element along said second flow path, such that said second fluid flows from said second inlet then through said second filter element then through said first filter element then to said second outlet, and comprising a seal blocking direct flow of said second fluid from the output of said second filter element to said second outlet such that said second fluid when exiting said second filter element must first flow through said first filter element along said second flow path and in said opposite direction in order to reach said second outlet, a spacer spacing said first filter element from said housing to form a collection space in communication with said second outlet, a fitting extending from said second inlet through said collection space and into said first filter element, said second filter element being received in said fitting, said fitting being engaged by said seal, wherein said housing extends axially between first and second axially spaced ends, said first filter element extends axially between first and second axially spaced ends, and comprising an axially extending boss integrally formed on the interior of said housing and extending from said second end of said housing axially toward said first end of said housing and having a central axially extending passage receiving said second filter element and having a concentric annular shoulder axially spacing said second end of said first filter element from said second end of said housing to form said collection space said boss providing both said fitting and said spacer, said second end of said first filter element is closed by an end cap having an aperture therethrough through which said boss extends, and comprising an annular resilient member bearing radially between said boss and said end cap at said aperture and bearing axially between said shoulder and said end cap, said resilient member providing said seal.

35. The filter according to claim 34 wherein said resilient member has an outer annular surface of a first diameter engaging said end cap at said aperture, and an outer annular surface of a second diameter larger than said first diameter and axially between said shoulder and said end cap at said aperture.

36. A filter for filtering fluid from a machine, comprising:

a filter housing having a first inlet receiving a first fluid from said machine, a first outlet returning said first fluid to said machine, a second inlet selectively receiving a second fluid from a source of cleaning fluid, and a second outlet exhausting said second fluid;

a first filter element in said filter housing;

said filter housing having a first flow path therethrough from said first inlet then through said first filter element in one direction then to said first outlet;

said filter housing having a second flow path therethrough from said second inlet then through said first filter element in the opposite direction then to said second outlet, said first and second flow paths having common but opposite direction portions through said first filter element; and a second filter element in said second flow path, wherein said first filter element is an annular member having a hollow interior, and said second filter element is in said second flow path between said second inlet and said hollow interior of said first filter element, wherein said housing has a first axial end at said first outlet and a second axial end at said second inlet, and said annular member has first and second axially spaced ends proximate said first and second ends, respectively, of said housing, and comprising a fitting comprising a first section extending through said second end of said housing and providing said second inlet, said first section having an internal side extending interiorly of said housing wherein the internal side of said first section receives said second filter element, said fitting comprising a second section extending through said second end of said first filter element, said second section having a first side extending out of said first filter element and receiving said first section, said second section having a second side extending into said first filter element and passing said second fluid from said second filter element to said first filter element, and comprising a spacer extending from said second end of said housing and engaging said second end of said first filter element and spacing same from said second end of said housing, wherein said first section is mounted to said second end of said housing, said second section engages said first section, said second end of said first filter element has an end cap with an aperture therethrough through which said second section extends, said end cap at said aperture engages said second section in sealing relation adjacent said spacer and on the opposite axial side thereof from said second inlet, wherein said second section has a raised annular shoulder of a first diameter, said second section is engaged by said end cap at an opening in said end cap of a second diameter and forming a seal, said first section is received in said second section in telescoping relation and engaged at an opening in said second section of a third diameter, wherein said first diameter is larger than said second diameter, and said second diameter is larger than said third diameter.

37. A filter for filtering fluid from a machine, comprising:

a filter housing having a first inlet receiving a first fluid from said machine, a first outlet returning said first fluid to said machine, a second inlet selectively receiving a second fluid from a source of cleaning fluid, and a second outlet exhausting said second fluid;

a first filter element in said filter housing;

said filter housing having a first flow path therethrough from said first inlet then through said first filter element in one direction then to said first outlet;

said filter housing having a second flow path therethrough from said second inlet then through said first filter element in the opposite direction then to said second outlet, said first and second flow paths having common but opposite direction portions through said first filter element; and a second filter element in said second flow path, wherein said first filter element is an annular member having a hollow interior, and said second filter element is in said second flow path between said second inlet and said hollow interior of said first filter element, wherein said housing has a first axial end at said first outlet and a second axial end at said second inlet, and said annular member has first and second axially spaced ends proximate said first and second ends respectively, of said housing, and comprising a boss extending from said second end of said housing axially toward said first end of said housing and through said second end of said first filter element and into said hollow interior thereof, said boss having an internal cavity receiving said second filter element, wherein said boss has a first section of a first outer diameter and first inner diameter extending axially inwardly from said second end of said housings and said boss has a second section of a second outer diameter and second inner diameter extending axially inwardly from said first section wherein said first outer diameter is greater than said second outer diameter, wherein said second end of said first filter element is closed by an end cap having an aperture therethrough through which said second section of said boss extends, and comprising an annular seal en-aging said boss at said second section, wherein said first and second sections of said boss meet at an axially facing shoulder, and wherein said seal engages said boss at the junction of said shoulder and said second section.

38. A filter for filtering fluid from a machine comprising:

a filter housing having a first inlet receiving a first fluid from said machine, a first outlet returning said first fluid to said machine a second inlet selectively receiving a second fluid from a source of cleaning fluid, and a second outlet exhausting said second fluid;

a first filter element in said filter housing;

said filter housing having a first flow path therethrough from said first inlet then through said first filter element in one direction then to said first outlet;

said filter housing having a second flow path therethrough from said second inlet then through said first filter element in the opposite direction then to said second outlet, said first and second flow paths having common but opposite direction portions through said first filter element; and a second filter element in said second flow path, wherein said first filter element is an annular member having a hollow interior, and said second filter element is in said second flow path between said second inlet and said hollow interior of said first filter element, wherein said housing has a first axial end at said first outlet and a second axial end at said second inlet and said annular member has first and second axially spaced ends proximate said first and second ends respectively of said housing and comprising a boss extending from said second end of said housing axially toward said first end of said housing and through said second end of said first filter element and into said hollow interior thereof, said boss having an internal cavity receiving said second filter element, wherein said boss has a first section of a first outer diameter and first inner diameter extending axially inwardly toward said first filter element from said second end of said housing, and said boss has a second section of a second outer diameter and second inner diameter extending axially inwardly toward said first filter element from said first section, wherein said first outer diameter is greater than said second outer diameter, wherein said cavity is formed by said first section of said boss at said first inner diameter providing a first cavity portion, and by said second section of said boss at said second inner diameter providing a second cavity portion, and wherein said first inner diameter is larger than said second inner diameter, wherein said second filter element extends axially and is disposed in both said first and second cavity portions.

39. A filter for filtering fluid from a machine comprising:

a filter housing having a first inlet receiving a first fluid from said machine a first outlet returning said first fluid to said machine a second inlet selectively receiving a second fluid from a source of cleaning fluid and a second outlet exhausting said second fluid;

a first filter element in said filter housing;

said filter housing having a first flow path therethrough from said first inlet then through said first filter element in one direction then to said first outlet;

said filter housing having a second flow path therethrough from said second inlet then through said first filter element in the opposite direction then to said second outlet, said first and second flow paths having common but opposite direction portions through said first filter element; and a second filter element in said second flow path, wherein said first filter element is an annular member having a hollow interior, and said second filter element is in said second flow path between said second inlet and said hollow interior of said first filter element, wherein said housing has a first axial end at said first outlet and a second axial end at said second inlet and said annular member has first and second axially spaced ends proximate said first and second ends respectively of said housing and comprising a boss extending from said second end of said housing axially toward said first end of said housing and through said second end of said first filter element and into said hollow interior thereof, said boss having an internal cavity receiving said second filter element, wherein said boss has a first section of a first outer diameter and first inner diameter extending axially inwardly from said second end of said housing, and said boss has a second section of a second outer diameter and second inner diameter extending axially inwardly from said first section, wherein said first outer diameter is greater than said second outer diameter, wherein said cavity is formed by said first section of said boss at said first inner diameter providing a first cavity portion and by said second section of said boss at said second inner diameter providing a second cavity portion, and wherein said first inner diameter is larger than said second inner diameters, wherein said second filter element is disposed only in said first cavity portion.

40. A filter for filtering fluid from a machine, comprising:

a filter housing having a first inlet receiving a first fluid from said machine, a first outlet returning said first fluid to said machine, a second inlet selectively receiving a second fluid from a source of cleaning fluid, and a second outlet exhausting said second fluid;

a first filter element in said filter housing and having an end cap facing said second inlet;

said filter housing having a first flow path therethrough from said first inlet; then through said first filter element in one direction then to said first outlet;

said filter housing having a second flow path therethrough from said second inlet then through said first filter element in the opposite direction then to said second outlet, said first and second flow paths having common but opposite direction portions through said first filter element;

a fitting comprising a first section extending from said housing, and a second section extending into said first filter element said first and second sections meeting at an axially facing shoulder engaging said end cap; and a second filter element disposed within said filter housing in at least one of said sections.

41. The filter according to claim 40 wherein said sections engage in telescoping relation.

42. The filter according to claim 41 wherein one of said sections surrounds the other of said sections in concentric relation, and wherein said second filter element is in said other section.

43. The filter according to claim 40 wherein said second filter element is in said first section.

44. The filter according to claim 40 wherein said first filter element is spaced from said housing by a spacer defining a collection space for receiving said first fluid flowing from said first filter element along said second flow path, said first section extends from said housing into said collection space, and said second section extends from said first filter element into said collection space.

45. The filter according to claim 44 wherein said first and second sections extend along a common axis, said first section extending interiorly of said housing along said axis into said collection space and having an internal axially extending first cavity, said second section extending from said first section along said axis into said first filter element and having an internal axially extending second cavity, and wherein said second filter element is in at least one of said cavities.

46. The filter according to claim 45 wherein said second filter element is in only one of said cavities.

47. The filter according to claim 45 wherein said second filter element extends axially in both of said cavities.

48. The filter according to claim 40 wherein said sections are integral with each other.

49. The filter according to claim 48 wherein said first section extends integrally from said housing, and said second section extends integrally from said first section.

50. A filter for filtering fluid from a machine comprising:

a filter housing having a first inlet receiving a first fluid from said machine, a first outlet returning said first fluid to said machine a second inlet selectively receiving a second fluid from a source of cleaning fluid, and a second outlet exhausting said second fluid;

a first filter element in said filter housing;

said filter housing having a first flow path therethrough from said first inlet then through said first filter element in one direction then to said first outlet;

said filter housing having a second flow path therethrough from said second inlet then through said first filter element in the opposite direction then to said second outlet, said first and second flow paths having common but opposite direction portions through said first filter element;

a fitting comprising a first section extending from said housing, and a second section extending into said first filter element; and a second filter element in at least one of said sections, wherein said first filter element is spaced from said housing by a spacer defining a collection space for receiving said first fluid flowing from said first filter element along said second flow path, said first section extends from said housing into said collection space, and said second section extends from said first filter element into said collection space, wherein said first and second sections extend along a common axis, said first section being mounted to said housing and extending interiorly of said housing along said axis into said collection space and having an internal axially extending cavity and having an axial end wall facing toward said first filter element and having an opposite axial open end, said second filter element being received in said cavity and stopped against said axial end wall, and comprising a valve mounted to said first section at said opposite axial open end and closing said cavity and trapping said second filter element therein, said valve extending exteriorly of said housing along said axis, and wherein said second section extends from said first section along said axis into said first filter element.

51. A filter for filtering fluid from a machine, comprising:

a filter housing having a first inlet receiving a first fluid from said machine, a first outlet returning said first fluid to said machine, a second inlet selectively receiving a second fluid from a source of cleaning fluid, and a second outlet exhausting said second fluid;

a first filter element in said filter housing;

said filter housing having a first flow path therethrough from said first inlet then through said first filter element in one direction then to said first outlet;

said filter housing having a second flow path therethrough from said second inlet then through said first filter element in the opposite direction then to said second outlet, said first and second flow paths having common but opposite direction portions through said first filter element;

a fitting comprising a first section extending from said housing, and a second section extending into said first filter element; and a second filter element disposed within said housing in at least one of said sections, wherein said sections are integral with each other, wherein said first section extends integrally from said housing, and said second, section extends integrally from said first section, wherein said first and second sections meet at a shoulder, and wherein said first filter element is spaced from said housing by said shoulder defining a collection space for receiving said first fluid flowing from said first filter element along said second flow path, said first section extending from said housing into said collection space, said second section extending through said first filter element into said collection space.

52. The filter according to claim 51 wherein said first and second sections extend along a common axis and form an internal cavity, said first section having a first internal axially extending cavity portion, said second section having a second internal axially extending cavity portion.

53. The filter according to claim 52 wherein said first cavity portion has an externally accessible axial open end, and comprising a valve mounted to said first section at said axial open end and closing said cavity and trapping said second filter element therein.

54. The filter according to claim 53 wherein said second filter element extends axially in each of said first and second cavity portions.

55. The filter according to claim 53 wherein said second filter element is disposed exclusively in said first cavity portion.

56. A reusable oil filter adapted to filter oil used in an apparatus, said filter comprising:

a housing for connection to the apparatus said housing having a top end portion and a bottom end portion said housing further having an oil inlet at said top end portion for receiving oil to be filtered and an oil outlet at said top end portion for discharging filtered oil to the apparatus:

tubular filter media disposed within said housing said tubular filter media having a radially outer inlet side fluidly connected to said inlet and an interior outlet side defining a void space, said void space being fluidly connected to said outlet, said filter media retaining portions of contaminated oil, a normally closed backwashing inlet connected on said bottom end portion of said housing for introducing pressurized gas below a surface of the filtered oil through said filter media said backwashing inlet having a fitting protecting upwardly from and displaced centrally with respect to the bottom of said housing and extending medially of said filter media into said void space;

a gas filter in said backwashing inlet for filtering said pressurized gas;

an oil drain located adjacent said inlet side and connected with said bottom end portion of said housing for draining contaminated oil from said housing:

wherein said pressurized gas introduced through said gas filter below the surface of the filtered oil forces filtered oil to backflow through said filter media displacing the contaminated oil from said filter media and creates a gas-oil foam for further cleaning said filter media while said housing- remains connected to the apparatus, said gas filter preventing contamination of said filter media from said pressurized gas, and comprising a fitting retaining said gas filter and extending from said bottom end portion of said housing upwardly along an axis into said housing and then into said void space of said tubular filter media, said fitting having an internal axially extending cavity having a wall with an opening therethrough communicating with said void space, and having a bottom opposite axial open end, said gas filter being received in said cavity, and a valve mounted to said fitting at said opposite axial open end and closing said cavity and trapping said gas filter therein.

* * * * *

UNITED STATES PATENT AND TRADEMARK OFFICE
CERTIFICATE OF CORRECTION

PATENT NO. : 5,779,900
DATED : July 14, 1998
INVENTOR(S) : Christopher E. Holm et al.

It is certified that error appears in the above-identified patent and that said Letters Patent is hereby corrected as shown below:

Claim 16, col. 8, line 64 (Examiner's Amendment dated 2/27/98, claim 7, line 9)

Delete "and axially"

Claim 37, col. 13, line 1 (Amendment dated 12/1/97, claim 26, line 24)

Delete "housings" and substitute therefor --housing--

Claim 37, col. 13, line 9 (Amendment dated 12/1/97, claim 26, line 30)

Delete "en-aging" and substitute therefor --engaging--

Claim 39, col. 14, line 41 (Amendment dated 12/1/97, claim 29, line 31)

Delete "diameters" and substitute therefor --diameter--

Signed and Sealed this

Twentieth Day of October, 1998

Attest:

Attesting Officer

BRUCE LEHMAN
Commissioner of Patents and Trademarks